(12) United States Patent
O'Connor

(10) Patent No.: US 10,867,605 B2
(45) Date of Patent: Dec. 15, 2020

(54) EARBUD HAVING AUDIO RECOGNITION NEURAL NET PROCESSOR ARCHITECTURE

(71) Applicant: AVNERA CORPORATION, Beaverton, OR (US)

(72) Inventor: Christopher James O'Connor, Beaverton, OR (US)

(73) Assignee: AVNERA CORPORATION, Hillsboro, OR (US)

( * ) Notice: Subject to any disclaimer, the term of this patent is extended or adjusted under 35 U.S.C. 154(b) by 0 days.

(21) Appl. No.: 16/399,757

(22) Filed: Apr. 30, 2019

(65) Prior Publication Data
US 2019/0335269 A1  Oct. 31, 2019

Related U.S. Application Data

(60) Provisional application No. 62/664,885, filed on Apr. 30, 2018.

(51) Int. Cl.
| | |
|---|---|
| *G10L 15/22* | (2006.01) |
| *G06N 3/04* | (2006.01) |
| *G06F 17/16* | (2006.01) |
| *G10L 15/16* | (2006.01) |
| *G06F 17/14* | (2006.01) |
| *H04R 1/10* | (2006.01) |
| *G10L 15/08* | (2006.01) |

(52) U.S. Cl.
CPC ............ *G10L 15/22* (2013.01); *G06F 17/142* (2013.01); *G06F 17/16* (2013.01); *G06N 3/04* (2013.01); *G10L 15/16* (2013.01); *H04R 1/105* (2013.01); *H04R 1/1008* (2013.01); *H04R 1/1016* (2013.01); *H04R 1/1041* (2013.01); *H04R 1/1091* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,155,263 B1* | 12/2006 | Bergamo | .......... | H04W 52/0229 455/574 |
| 9,047,857 B1* | 6/2015 | Barton | .................... | G10L 15/22 |
| 10,194,259 B1* | 1/2019 | Martin | .................... | G06F 3/167 |
| 2014/0085959 A1* | 3/2014 | Saraswat | .................. | G11C 7/10 365/63 |
| 2015/0222977 A1* | 8/2015 | Angel, Jr. | .............. | H04R 1/105 381/74 |
| 2015/0331660 A1* | 11/2015 | Kalampoukas | ........ | H04H 60/58 700/94 |

(Continued)

*Primary Examiner* — Paul W Huber
(74) *Attorney, Agent, or Firm* — Lando & Anastasi, LLP

(57) ABSTRACT

A system for operating an earbud can include a primary processor to control the earbud and operate in a low-power state, a microphone to receive an input, a casing having a speaker configured to provide audio output from the primary processor to a user's ear, the casing being configured to maintain a position in a user's ear canal to maintain a position of the speaker within the user's ear, a listening sub-system to convert the input into an output signal, and a neural net processor to receive the output signal from the listening sub-system and determine whether to generate a wake signal based on the received output signal.

20 Claims, 10 Drawing Sheets

(56) References Cited

U.S. PATENT DOCUMENTS

| | | | |
|---|---|---|---|
| 2017/0124451 A1* | 5/2017 | Barham | G06F 9/5038 |
| 2017/0311261 A1* | 10/2017 | Mozer | H04W 8/24 |
| 2019/0037298 A1* | 1/2019 | Reily | H04R 1/1041 |
| 2019/0139541 A1* | 5/2019 | Andersen | G06F 3/0304 |
| 2019/0155524 A1* | 5/2019 | Frank | G06F 3/0667 |

* cited by examiner

EARBUD HAVING AUDIO RECOGNITION NEURAL NET PROCESSOR ARCHITECTURE

CROSS-REFERENCE TO RELATED APPLICATION

This application claims the benefit of U.S. Provisional Patent Application No. 62/664,885, filed Apr. 30, 2018 and entitled "Audio Recognition Processor Architecture," the disclosure of which is incorporated herein by reference in its entirety.

TECHNICAL FIELD

Embodiments of the disclosed technology are generally directed to apparatuses that are structured to perform efficient audio recognition, as well as associated methods.

BACKGROUND

Conventional audio processing systems continue to raise performance capabilities at a cost of additional electrical power consumption. This is increasingly problematic for battery-powered or other portable electronic systems that have low power constraints, because the quality of audio processing decreases when power budgets are also decreased.

FIG. 1 illustrates an example of a conventional audio processing system. An always-on listening system continuously samples audio signals. Such systems typically include Voice Activity Detection (VAD), which recognizes when someone is speaking near the vicinity of a microphone, as well as keyword detection that can analyze voice patterns to determine when particular keywords have been spoken.

Modern systems use keyword detection to access features of a well-connected system. For example, a keyword or phrase may be "hey Siri", "Ok Google", Or "Alexa" to wake systems provided by Apple, Inc., Google, Inc., or Amazon.com, Inc., respectively. In one particular example, if a user says "hey Ski", the always-on listening system then passes on audio data to a main system processor to determine what the user wishes to do. If the user wishes to check the weather, the user would say "hey Siri, what's the weather today?".

Conventional systems use the always-on listening system to detect the words "hey Ski", and, when so detected, pass on the audio signal to the main system processor, which passes a digital audio request to a host OS processor. The host OS processor, in turn, sends the request to a cloud processor, i.e., one connected to the Internet, for natural language (NL) processing. The cloud-based processing detects the request, performs the requested action, and sends back a digital audio response to the request. The main system processor then sends the digital audio response to a speaker or set of headphones to communicate the results of the request to the user. In this case, an audio response describes the upcoming weather.

Although these conventional systems operate well, they consume substantial electrical power. For instance, any processing performed by the main system processor requires a large memory to be operational, plus an Arithmetic Logic Unit (ALU), an instruction register and instruction decoder, a program counter, etc., not to mention the relatively large power consumed by an Input/Output (I/O) bus. Such large power requirements cause batteries to discharge quickly, or, to comply with low power requirements, processing speed is reduced which causes the overall quality of the system to suffer.

Implementations in accordance with the disclosed technology address these and other limitations.

DETAILED DESCRIPTION

Implementations of the disclosed technology are generally directed toward a new digital architecture that reduces digital operations toward a minimum for particular computations that are especially useful for audio processing or other data processing. Certain embodiments of the architecture may include specialized hardware to perform one or more digital signal processing functions that were formerly performed by a general-purpose processor. The new architecture may allow for increased processing with much less power overhead than conventional systems and, therefore, may be significantly more efficient than classical Central Processing Unit (CPU) systems.

Figure 2:
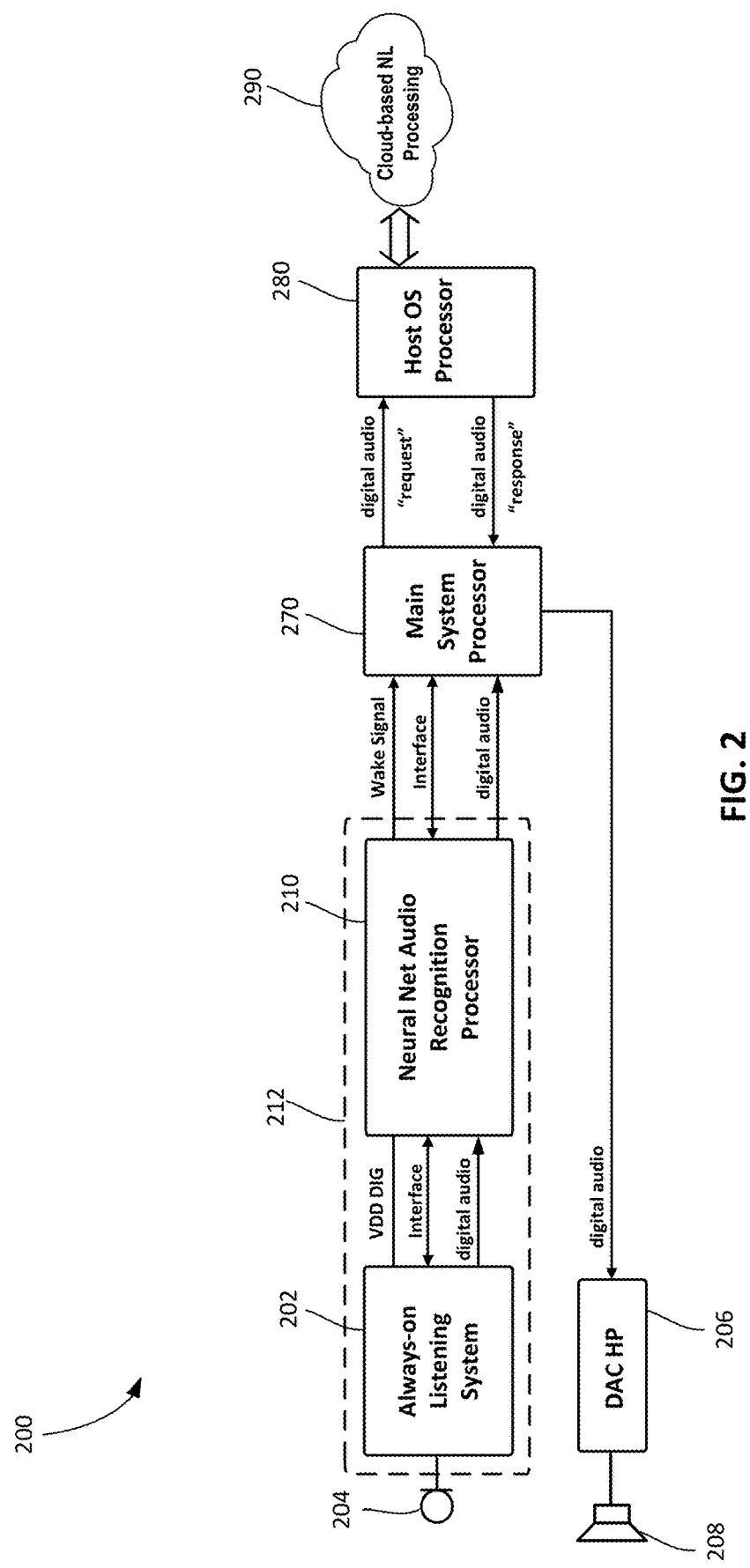
FIG. 2 is a system block diagram illustrating an example of a neural net processor architecture for audio recognition that works in conjunction with a conventional main system processor in accordance with certain implementations of the disclosed technology.

FIG. 2 is a system block diagram illustrating an example of a system 200 that includes a neural net processor architecture 210 for audio recognition that may be configured to work in conjunction with a conventional main system processor 270 according to certain embodiments of the disclosed technology.

In the example, the neural net processor 210 is closely coupled with and tightly integrated to an always-on listening sub-system 202. The listening sub-system 202 generally includes a combination of amplifiers and Analog to Digital Converters (ADCs) that may be used to convert time-varying analog signals, such as voice signals, for example, into digital signals that may be a representation of the analog signals.

In other alternative embodiments, the listening sub-system 202 may be formed by one or more sensors other than those for generating audio signals, such as accelerometers for measuring motion, temperature sensors for measuring temperature, pressure sensors for measuring pressure, proximity sensors, and smoke sensors, for example.

In such systems, the digital sub-systems, as described further below, may be particularly configured to perform a certain function or multiple functions based on the sensor input. For example, a pressure sensing system could be used to monitor pressure in a life-sustaining capsule and generate an alert for a main processor when particular pressure parameters have been exceeded, or a system that monitors an accelerometer output could determine when machinery was about to fail.

The listening sub-system 202 is typically coupled to one or more microphones 204 that convert acoustic energy to an electrical signal. The listening sub-system 202 also typically includes its own power management and core analog circuits. An interface may operate to send communication between the listening sub-system 202 and the neural net processor 210. In certain embodiments, the components of the listening sub-system 202 and the neural net processor 210 may be combined into a neural net processor 212 to provide a single audio processing system that may be coupled to a main system processor 270.

Figure 1:
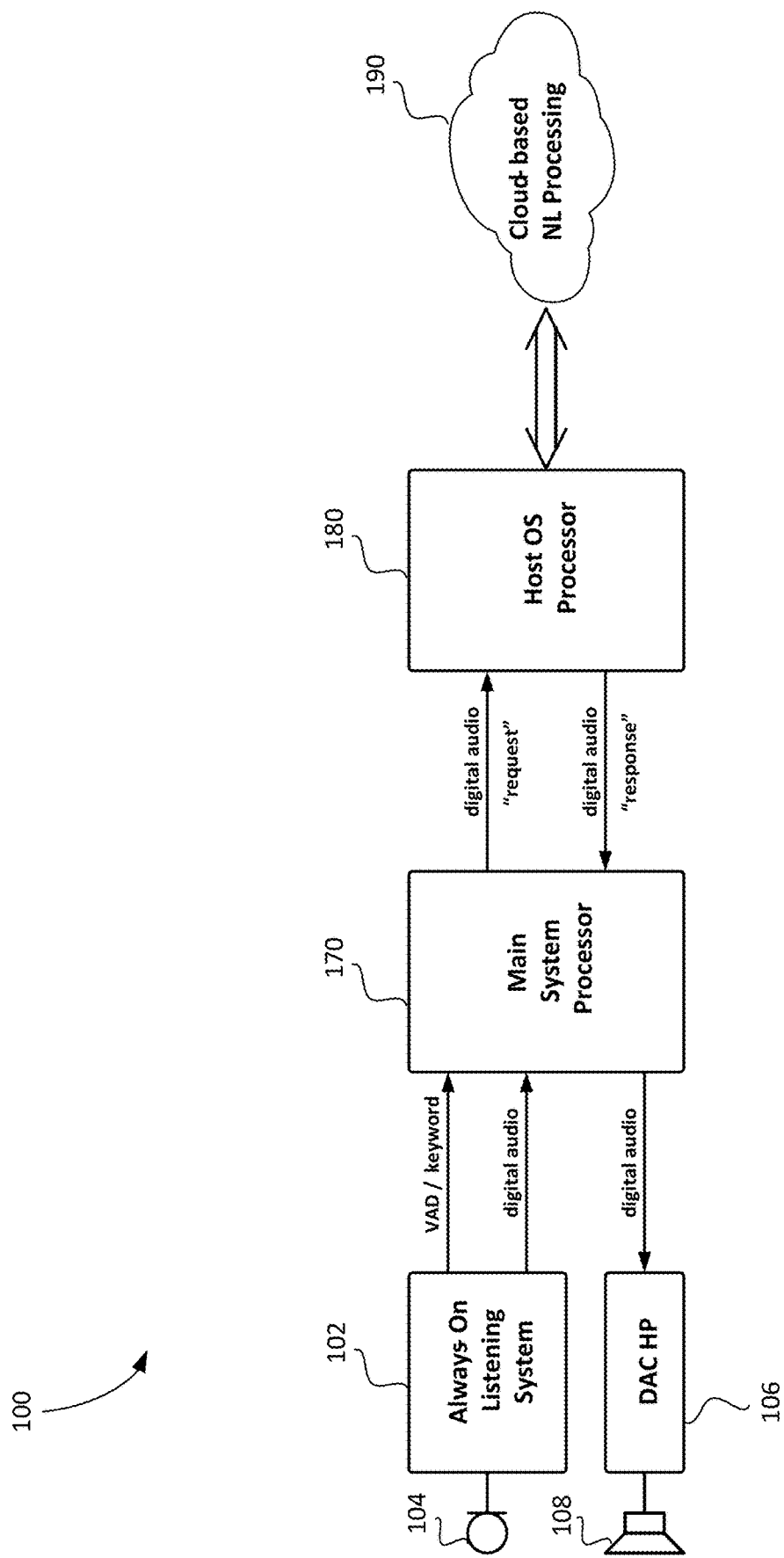
FIG. 1 is a system block diagram illustrating conventional audio recognition architecture and steps for processing audio recognition.

Differently than the audio processing system described above with reference to FIG. 1, the main system processor 270 need not be continuously operational. Instead, as illustrated in FIG. 2, the neural net processor 210 may be configured to generate a "wake" signal that causes the main system processor 270 to come out of a low-power, sleep state, e.g., only when necessary. In other words, the neural net processor 210, as described in more detail below, may efficiently operate to process audio data in a low-power manner that otherwise would have been performed by the higher-power consuming main system processor 270.

In addition to the wake signal, digital audio may be sent by the neural net processor 210 to the main system processor 270, e.g., for performing operations that the neural net processor 210 is not configured to support. In certain embodiments, the main system processor 270 may simply forward the digital audio, e.g., in the form of a request, to a host operating system (OS) processor 280, which, in turn, may forward the request to a cloud-based natural language (NL) processor 290, which may service the request. After serving the request, the cloud-based NL processor 290 may send a digital audio response back to the main system processor 270, which may send the response to a headphone 206 processor or other suitable processor that can convert the digital audio signals to an analog signal for playing to the user through a speaker 208 or set of headphones.

Figure 3:
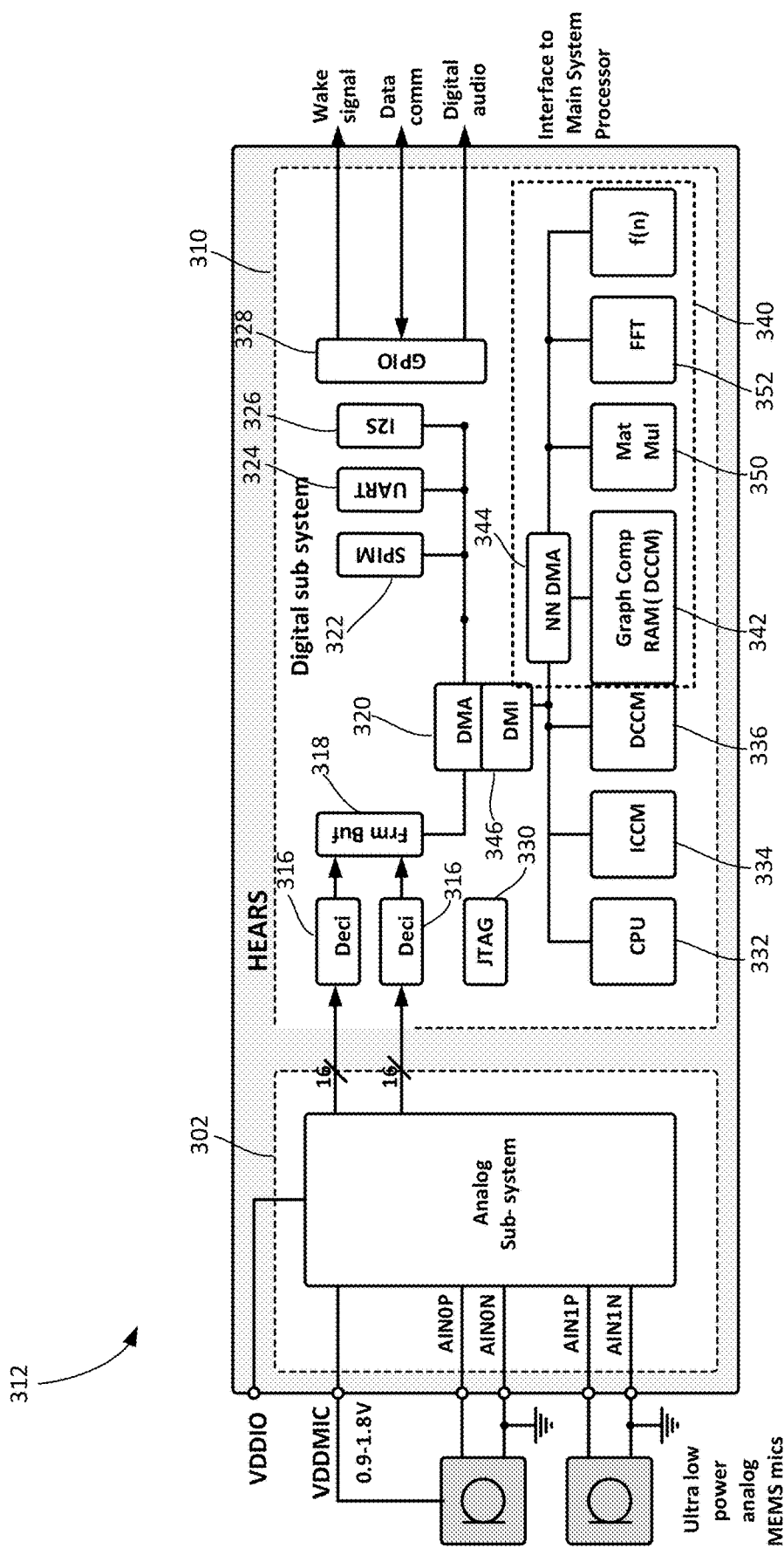
FIG. 3 is a detailed system block diagram of a neural net processor architecture, such as the neural net processor architecture illustrated in FIG. 2, in accordance with certain implementations of the disclosed technology.

FIG. 3 is a detailed system block diagram of an example system architecture for a neural net processor architecture 312, which may be an example of the neural net processor 212 of FIG. 2, in accordance with certain implementations of the disclosed technology. It will be appreciated that various other architectures may be possible without deviating from the scope of the disclosed technology.

In the example, the neural net processor 312 includes an always-listening sub-system 302, which may function similarly to the always-listening system 202 described above with reference to FIG. 2. Also in the example, the digital sub-system of the neural net processor 310 includes some components typically found in digital processors, such as decimators 316 that downsample (reduce the amount of) digital audio data received from the analog subsystem 302 to a lower, appropriate digital audio sample rate that is easier to process. The decimated digital data may be stored in a memory buffer 318 for later processing.

A Direct Memory Access 320 may be implemented to provide a way for one or more components of the neural net processor 310 to be able to directly access the data stored in the memory buffer 318, e.g., by referencing memory addresses rather than sending copies of the stored data itself.

There may be certain conventional components of the neural net processor 310 that are used for system control and IO interface, such as a small CPU 332, an Instruction Closely-Coupled Memory ICCM 334, and a Data Closely-Coupled Memory DCCM 336, for example. There may also be some peripheral components such as SPI (serial peripheral interface), UART and I2S for data communication and digital audio transport, one or more UARTs 324 for receiving data in an asynchronous manner, and a bus interface I2S 326. Further, a general-purpose input/output system 328 may be the physical interface that sends and receives signals between the neural net processor 310 and a general purpose processor, as described above. Finally, a JTAG interface 330 may provide access to the neural net processor 310 for testing and debugging.

A neural-net subsystem 340 of the neural net processor 310 may be configured to allow audio processing to be performed with very little electrical power consumption. Also part of the neural-net subsystem 340 may be a graph memory 342, e.g., formed of on-chip SRAM, for low power operation. The graph memory 342 can be used to store one or more computational flows, which, in turn, may be operated on to provide a resulting output. These computational flows may also be referred to herein as computation graphs.

It will be appreciated that such computational graphs may provide a framework and a set of parameters, such as weight constants, that may be used to perform complex problems, such as speech recognition, for example. These computational graphs may sometimes include cascade recognition, e.g., by which a series of steps may be performed and, depending on the outcome of a previous step, one or more additional steps may be performed.

The graph memory 342 may be dynamically configurable and re-configurable, e.g., meaning that, after an initial problem has been solved, or after an initial stage of the problem has been completed, the graph memory 342 may be readily configured for either a new stage of the same problem, or for a different problem altogether. The reconfiguration may occur locally or could be directed by, for instance, the main system processor 270 of FIG. 2.

In the example, a neural-net Direct Memory Access (DMA) 344 may provide a direct interface between the graph memory 342 and the hardware accelerators. The DMA 344 may also provide direct access to main memory, the audio frame memory buffer 318, and peripheral DMA access. In practice, the DMA 344 may be coupled through a processor Direct Memory Interface (DMI) 346, which may, in turn, be coupled to the previously described DMA 320, which may provide access into the audio memory buffer 318.

Coupled to the graph memory 342 in the example are a series of hardware accelerators that are particularly implemented to solve particular functions in minimal time and using minimal amounts of electrical power. In general, the hardware accelerators may be optimized to perform the mathematical functions that may be needed in the computational graph described in the graph memory 342. Example functions having hardware accelerators may include, but are not limited to, matrix multiplication 350, Fast Fourier Transforms (FFTs) 352, and other functions described below with reference to FIG. 4.

Figure 4:
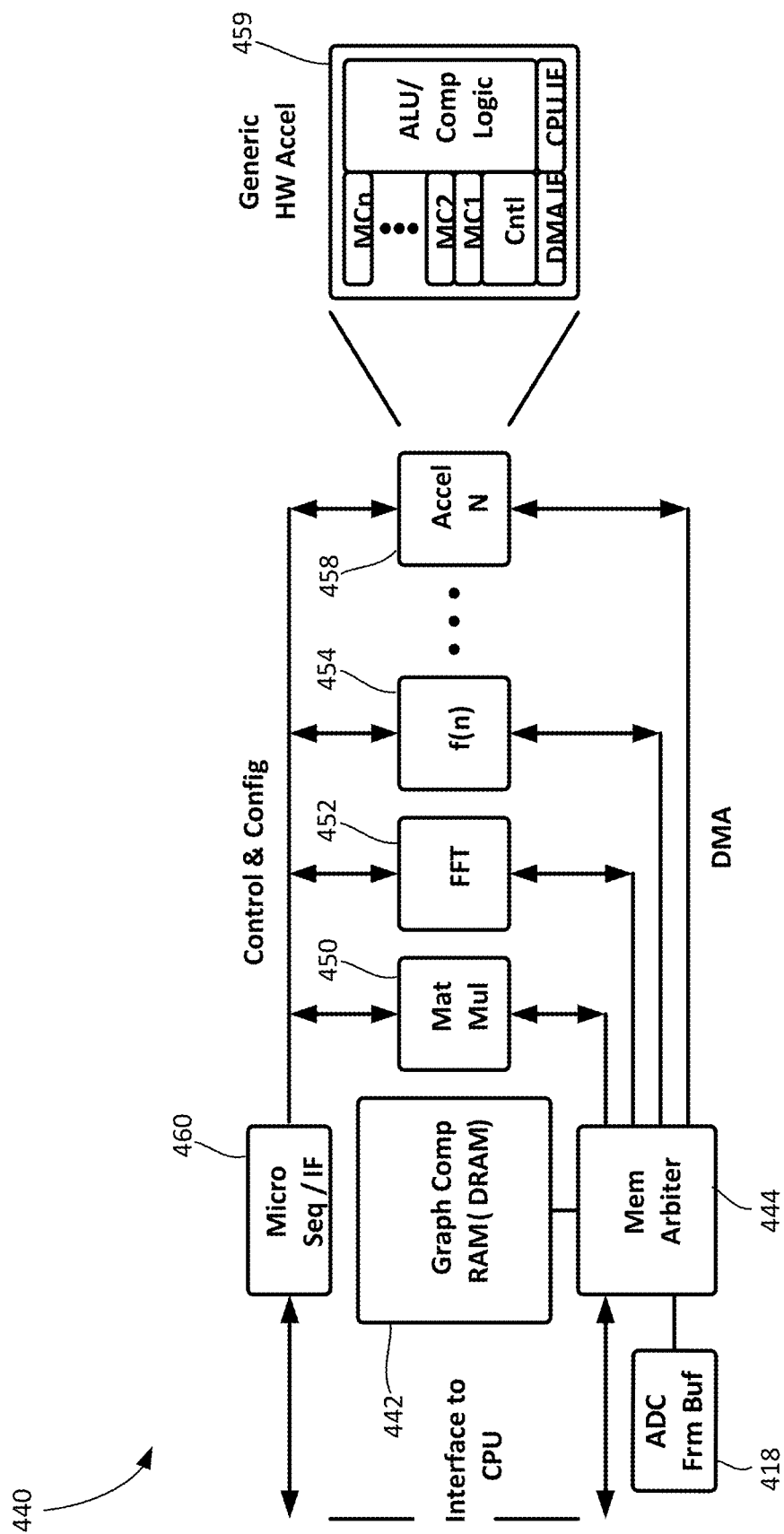
FIG. 4 is a detailed system block diagram illustrating an example of particular components of a neural net processor architecture, such as the neural net processor architecture illustrated in FIGS. 2 and 3, in accordance with certain implementations of the disclosed technology.

FIG. 4 is a detailed system block diagram illustrating an example of a neural-net subsystem 440 that may be an example implementation of the neural-net subsystem 340 described above with regard to FIG. 3. A graph memory 442 may also store computational graphs, e.g., as described above with reference to the graph memory 342. Also, a memory arbiter 444 may provide the function of providing the hardware accelerators with direct access the graph memory and access to one or more data buffers 418, e.g., as needed.

The memory arbiter may also allow the graph memory 342 to directly access the data stored in the data buffers 418. The memory arbiter 444 may combine one or more functions of the DMI 346 and the DMA 320 described above with reference to FIG. 3. It should be noted that the memory arbiter 444 may allow the hardware accelerators, e.g., as described below, to access memory without needing to go through an intermediary step of using a CPU to perform the functions. This saves appreciable electrical power over conventional systems that otherwise require a CPU to manage memory access.

A series of hardware accelerators may be designed to perform mathematical functions required to implement a particular computation graph. As described above, the hardware accelerators may implement any required mathematical function, such as one or more matrix multipliers 450 and FFTs 452, for example. Other hardware accelerators may implement other functions useful for solving complex problems, such as non-linear functions known as activation functions (e.g., tanh, sigmoid, ReLu), LSTM cell computation, 2D convolution computation, and softmax, for example.

The generalized hardware accelerator processor architecture is illustrated in FIG. 4 as reference 458, which may be an example of particularized hardware, such as the FFT 452, or a more general hardware structure that can be configured or programmed to operate as if it were particularized hardware. For example, the generic, self-contained, hardware accelerator 459 includes components that are typically found in small processors, such as areas for storing instances of parameters/microcode, an Arithmetic Logic Unit (ALU), some control hardware, as well as interfaces to memory (DMA interface) and to one or more CPUs (CPU interface). The DMA interface may provide access to the graph memory 442 and other main memory ICCM or DCCM. Other configurations of the self-contained hardware accelerator 459 may include a way to read and manipulate memory, as well as at least some ALU functions, for example.

Certain aspects of the disclosed technology as relating to achieving power efficient operation may include the local storage of some or all of the instances of parameters/microcode used by the hardware accelerators for a particular computational graph. By storing the instances locally, for example, these parameters do not need to be loaded each pass through the computational graph (e.g. for speech recognition this is every 10 ms). This may serve to eliminate many reads to the main memory for all the parameters of a computation graph.

A hardware sequencer 460 may be configured or programmed to direct which of the hardware accelerators 450, 452, etc. may be operational at any particular time, and which of their local instances of parameter and microcode to next be processed. In other words, the sequencer 460 may be configured to cause the matrix multiply accelerator 450 to operate several times, at various portions of memory, before initiating an FFT function performed by the FFT 452.

It will be appreciated that many other options and functions are possible, of which the above description is merely an example. In this manner, the sequencer 460 may be configured to initiate the various hardware accelerators to operate, e.g., in sequence, to execute computations based on the parameters/micro-code instance stored in the local hardware accelerator memory and working on variables. A CPU, such as the CPU 332 of FIG. 3, or even the CPU within the main system processor 270 of FIG. 2, may be used to configure or re-configure the sequencer 460 to perform particular operations, for example.

Some or all of the sub-components of the hardware accelerator 459 illustrated in FIG. 4 may be included in all or most of the hardware accelerators 450, 452, etc. Of particular note are the sub-components labeled MCx. When a hardware accelerator is configured for operation, those particular areas may be programmed or otherwise set up to include address pointers for memory as well as parameters that will be used for calculations when the particular MCx block is called on by the sequencer 460 to perform its operation.

Other data locally stored into the hardware accelerator may include a beginning and ending address for memory on which a series of operations is to take place. The fact that this information is stored and executed locally within the hardware accelerators makes the overall system significantly more power efficient. In other words, in this described system, it is not necessary for the hardware accelerators to fetch memory, which aids its power efficiency. Thus, pre-storing the microcode in the hardware accelerators and then using a sequencer to cause the particular microcode to be executed is highly power efficient.

In certain situations, the sequencer 460 may call a particular hardware accelerator to perform several operations many times in a row, e.g., using different calculation parameters, by having the sequencer 460 call various MC blocks within the hardware accelerator. An example is illustrated in FIG. 5 and described below.

In general, the specialized hardware illustrated in FIG. 4 may be selected and configured to operate on virtually any type of problem, especially those that may benefit from intensive calculations on data that is stored in a memory. Using specialized hardware that minimizes any CPU interaction may greatly minimize electrical power consumed compared to conventional solutions.

Figure 5:
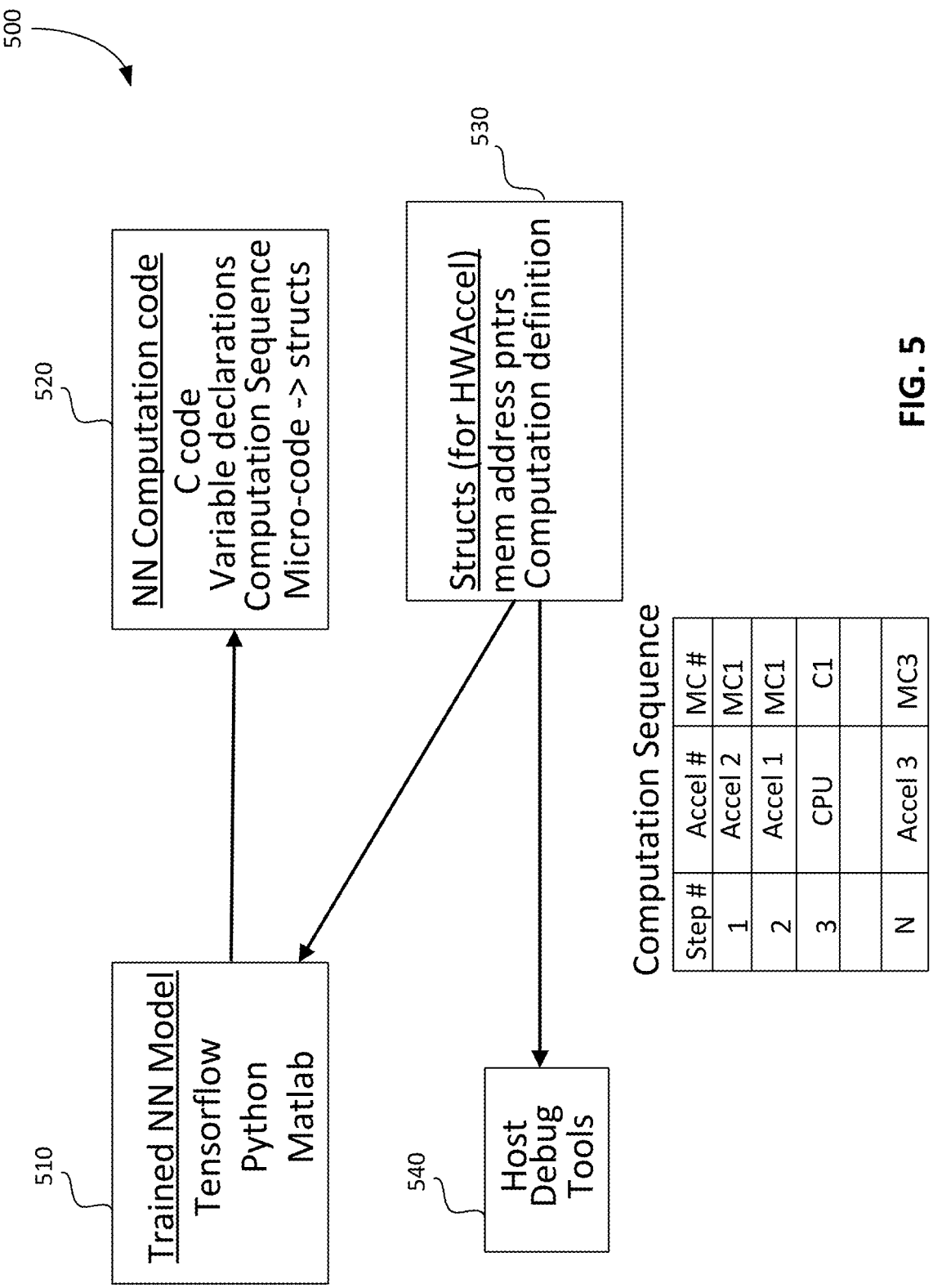
FIG. 5 is an example flow diagram illustrating how a neural net processor may be programmed or otherwise configured to perform a desired function in accordance with certain implementations of the disclosed technology.

FIG. 5 is an example of a flow diagram illustrating how the neural net processor, such as any of the neural net processor systems described herein, may be programmed or otherwise configured to performed a desired function in accordance with certain implementations of the disclosed technology. For example, a problem may be modeled in some type of neural-net model, e.g., using known tools such as Python, MATLAB, or Tensor flow. A translator, compiler, linker, or assembler may be used to generate neural-net computational code that implements the modeled system.

In certain embodiments, the computational code may be in the C programming language. This C language can be further modified to generate variable declarations, computational sequences, and micro-code that may be used to configure or program any of the neural-net systems described above. For example, the microcode and data memories of any of the hardware accelerators described above with reference to FIG. 4 may be properly coded and stored. This may also include setting up particular memory address pointers. Also, the sequencer 460 may be properly configured with a table of sequence numbers that, in turn, can cause one or more of the hardware accelerators to solve the problem previously modeled using the neural-net models.

The computation sequence in the bottom of FIG. 5 shows an example of instructions stored in the sequencer 460. In step 1, the sequencer 460 instructs the second hardware accelerator to begin operating on the microcode stored at location MC1. In step 2, the sequencer 460 instructs the first hardware accelerator to operate on microcode stored at its location MC1. As mentioned above, the sequencer 460 may have multiple sequential steps where the same hardware accelerator is performing the same functions at several microcode locations. For example, the sequencer may instruct the FFT 452 to execute code from locations MC1 and, following that completion, from location MC2, MC3, MC4 etc.

The system described herein generally provides a robust, configurable system to efficiently solve complex problems using a minimal amount of power. Such systems are well-suited for battery-powered systems, but are also suited for any system looking to reduce power requirements. Other notable benefits may include the performing of computations with a minimum of CPU interaction, which means the computations can be typically performed faster. In other words, even in systems that do not prioritize reduce power, implementations of the disclosed technology may serve to provide a solution that may yield superior results compared to existing systems.

Figure 6:
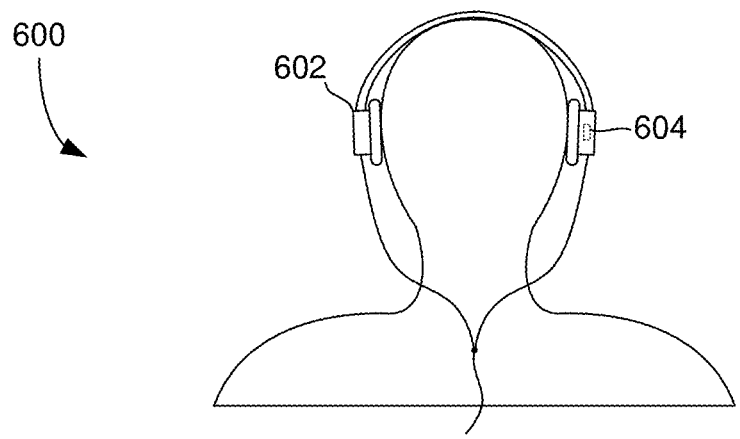
FIG. 6 illustrates an example of a headphone, which is depicted as being worn by the user, or on ear in accordance with certain embodiments of the disclosed technology.

FIG. 6 illustrates an example 600 of a headphone 602, which is depicted as being worn, or on ear, in accordance with certain embodiments of the disclosed technology. In the example, portions of or all of a headphone insertion detection system 604 as described herein is integrated with a neural net processor architecture, such as the neural net processor architecture 312 illustrated by FIG. 3.

Figure 7:
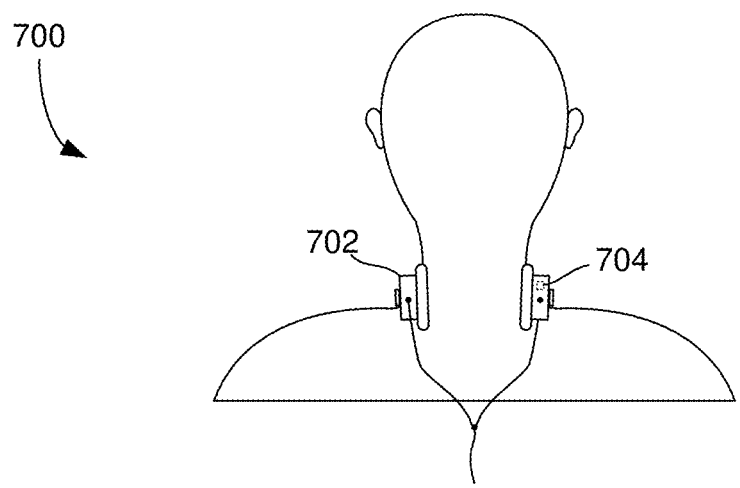
FIG. 7 illustrates an example of a headphone, such as the headphone of FIG. 6, which is depicted as being not worn by the user, or off ear in accordance with certain embodiments of the disclosed technology.

FIG. 7 illustrates an example 700 of a headphone 702, such as the headphone 602 of FIG. 6, having integrated therewith a neural net processor architecture, such as the neural net processor architecture 312 illustrated by FIG. 3. In the example 700, the headphone 700 is depicted as being not worn, or off ear, in accordance with certain embodiments of the disclosed technology.

Figure 8:
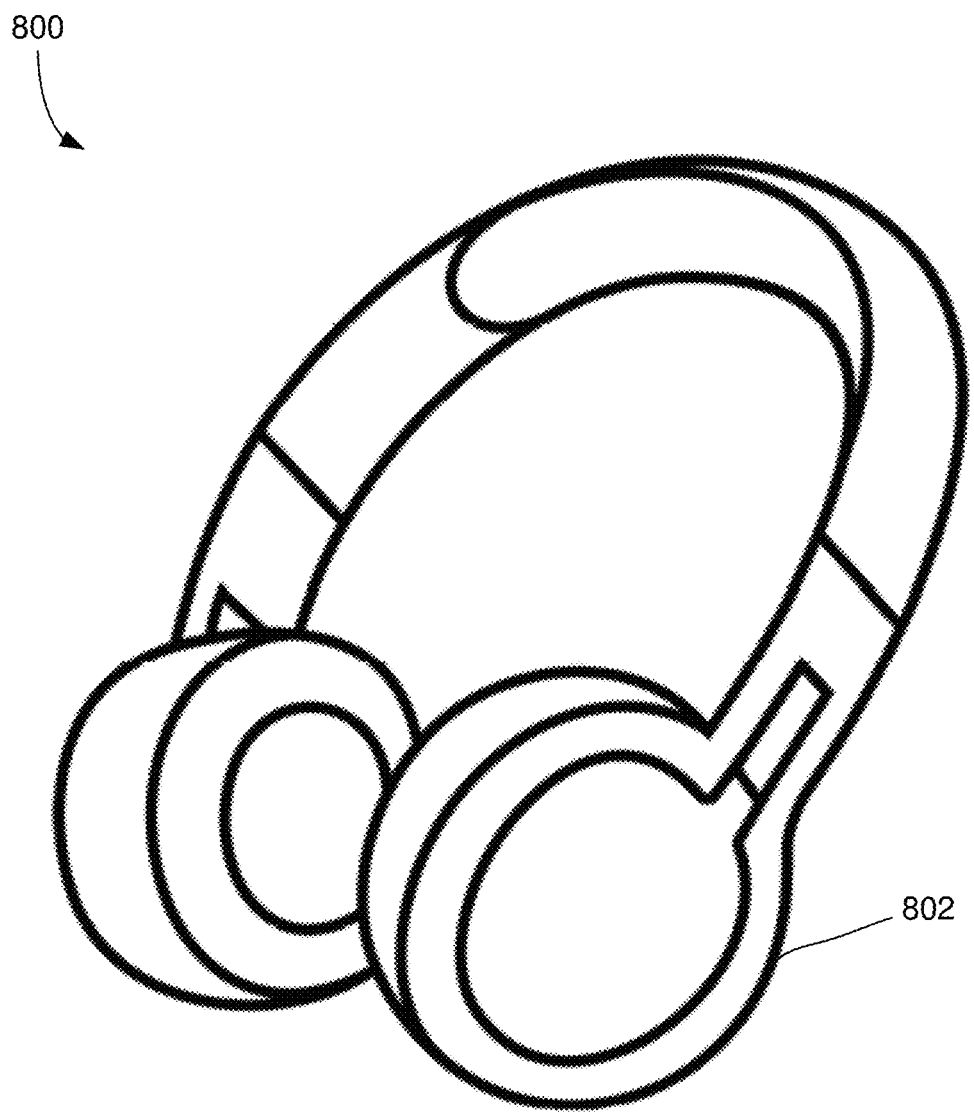
FIG. 8 is a perspective view illustrating an example of a headphone, such as the headphones of FIGS. 6 and 7, in accordance with certain embodiments of the disclosed technology.

FIG. 8 is a perspective view 800 illustrating an example of a headphone 802, such as the headphones 602 and 702 of FIGS. 6 and 7, respectively, in accordance with certain embodiments of the disclosed technology. It will be appreciated that, as used herein, the term headphone may be used to describe virtually any type of headphones that generally include one or more cup portions that each have a speaker or other suitable transducer configured to provide an audio output to a user.

A headphone as described herein is typically arranged to be worn such that each cup—and thus corresponding speaker—is on, around, or otherwise in close proximity to one of the user's ears, e.g., when the user desires to listen to music or other audio content. The headphone also generally includes a band or other mechanism configured to rest on top of or around the user's head so as to effectively maintain positioning of the speakers on, around, or otherwise in close proximity to the user's ears, e.g., so that the user may listen to music or other audio output provided from either one or both of the speakers. The headphone may be circumaural or supra-aural, for example. The headphone may be wired or wireless.

Figure 9:
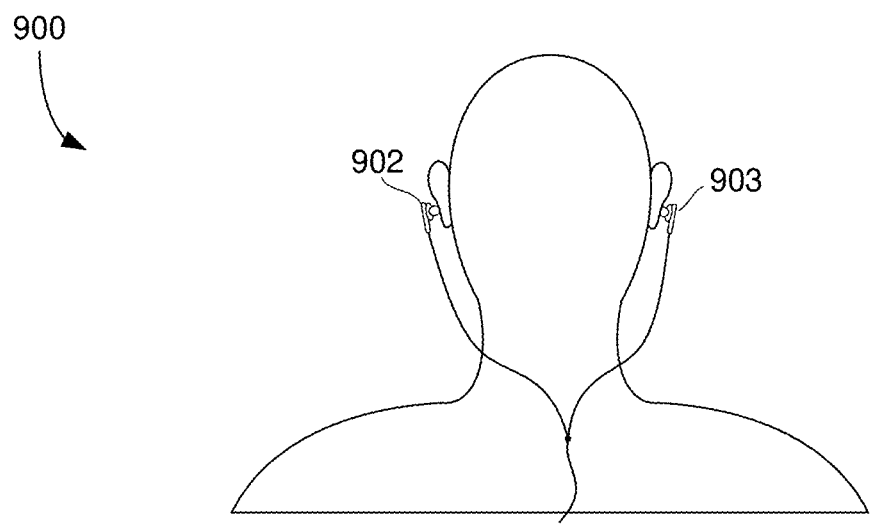
FIG. 9 illustrates an example of a pair of earbuds, which is depicted as being on ear in accordance with certain embodiments of the disclosed technology.

FIG. 9 illustrates an example 900 of a pair of earbuds 902 and 903, which is depicted as being worn, or in ear in accordance with certain embodiments of the disclosed technology. In the example, portions of or all of an earbud insertion detection system as described herein is integrated with a neural net processor architecture, such as the neural net processor architecture 312 illustrated by FIG. 3.

Figure 10:
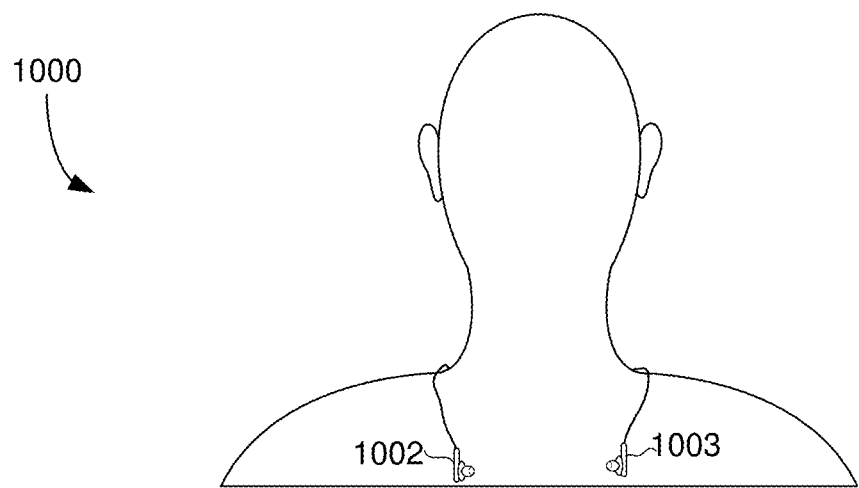
FIG. 10 illustrates an example of a pair of earbuds, such as the earbuds of FIG. 9, which is depicted as being off ear in accordance with certain embodiments of the disclosed technology.

FIG. 10 illustrates an example 1000 of a pair of earbuds 1002 and 1003, such as the earbuds 902 and 903 of FIG. 9, having integrated therewith a neural net processor architecture, such as the neural net processor architecture 312 illustrated by FIG. 3. In the example 1000, the pair of earbuds 1002 and 1003 is depicted as being not worn, or out ear, in accordance with certain embodiments of the disclosed technology.

Figure 11:
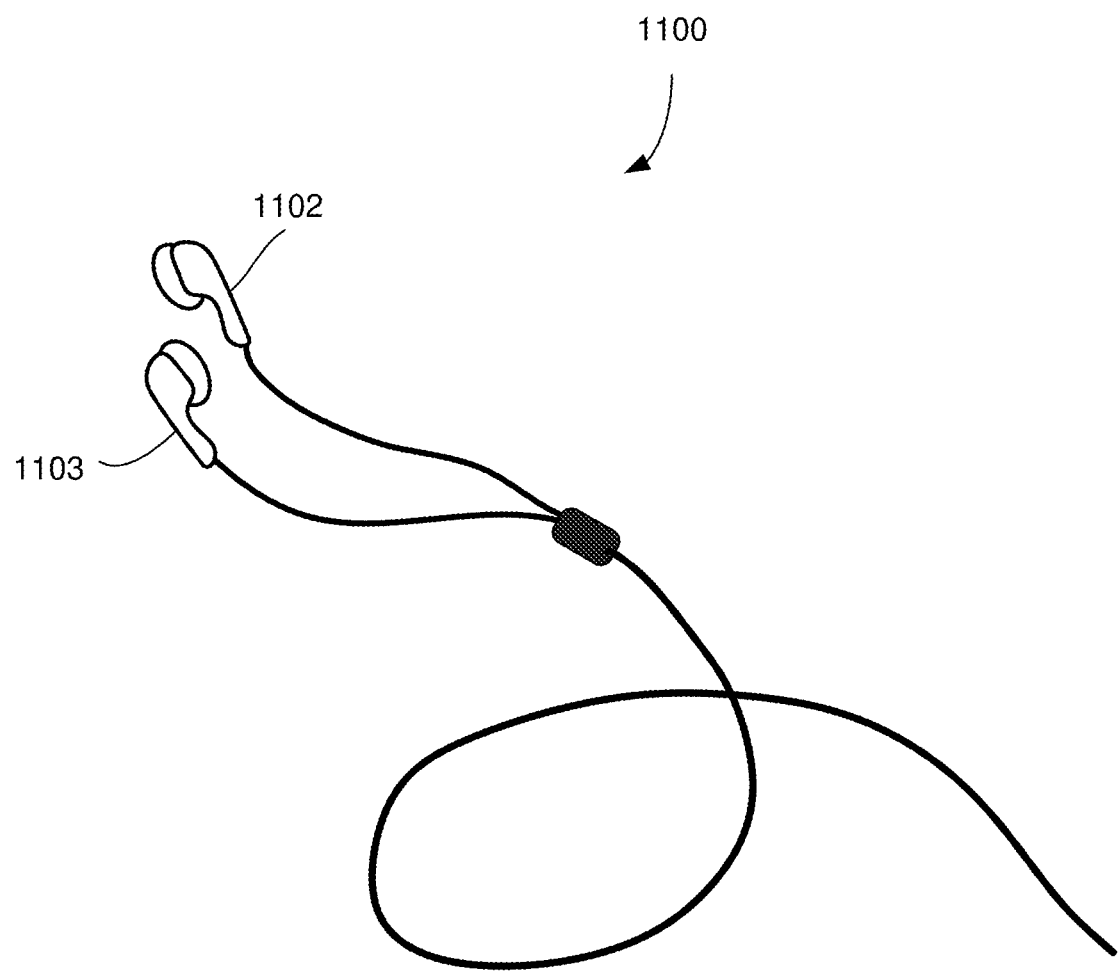
FIG. 11 is a perspective view illustrating an example of a pair of earbuds, such as the earbuds of FIGS. 9 and 10, in accordance with certain embodiments of the disclosed technology.

FIG. 11 is a perspective view 1100 illustrating an example of a pair of earbuds 1102 and 1103, such as the earbuds 902-903 and 1002-103 of FIGS. 9 and 10, respectively, in accordance with certain embodiments of the disclosed technology. It will be appreciated that, as used herein, the term earbud may be used to describe virtually any type of individual electronic device having a casing or other suitable portion that is configured to house or otherwise support a speaker or other suitable transducer integrated therewith and configured to provide an audio output to a user. The earbud is typically arranged to be worn in or in close proximity to a user's ear canal and may optionally be circumaural or supra-aural, for example. The earbud may be wired or wireless.

Figure 12:
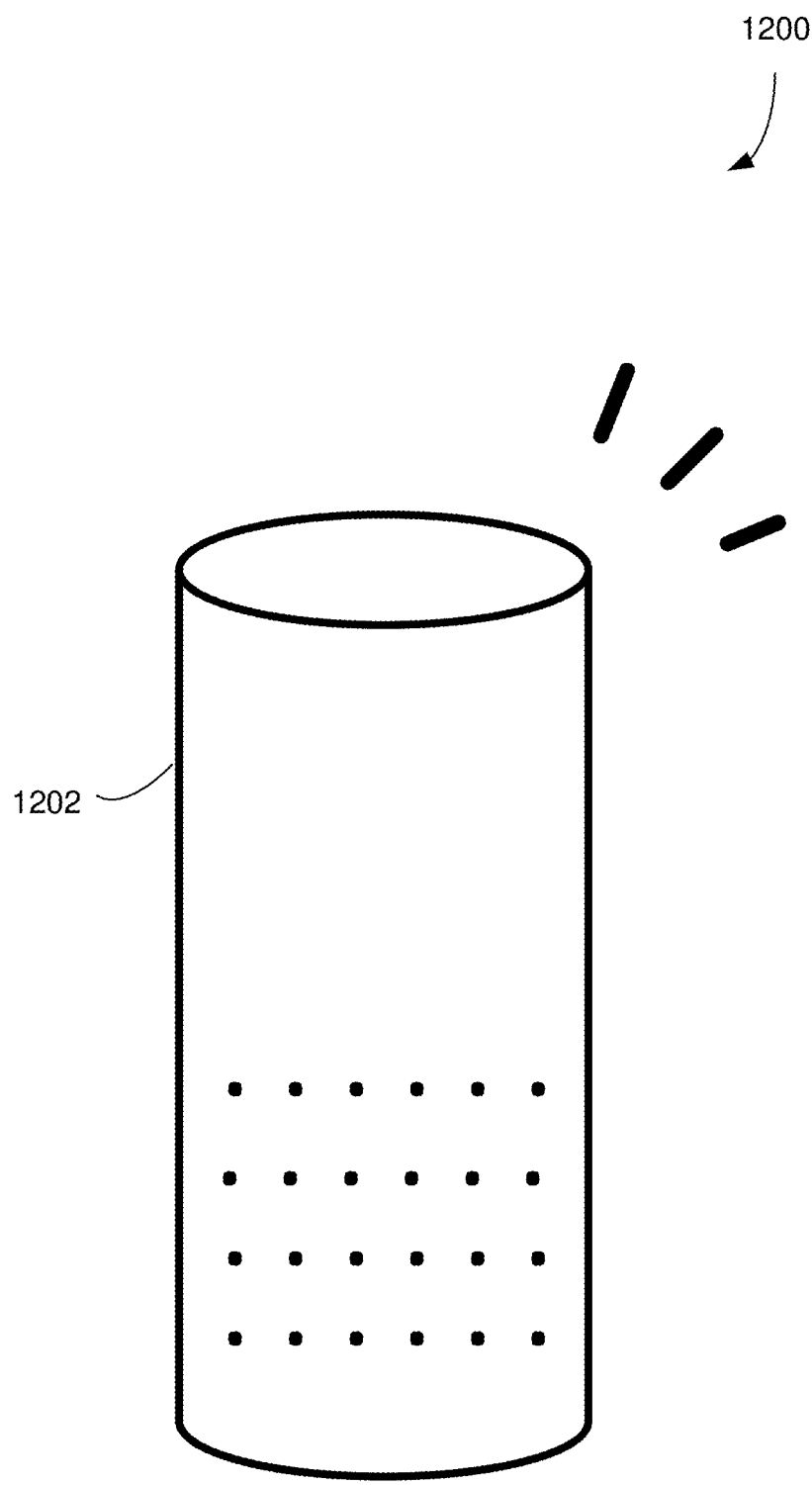
FIG. 12 is a perspective view illustrating an example of a personal interactive speaker device in accordance with certain embodiments of the disclosed technology.

FIG. 12 is a perspective view 1200 illustrating an example of a personal interactive speaker device 1202 in accordance with certain embodiments of the disclosed technology. The personal interactive speaker device 1202, such as an Amazon Alexa device, may have incorporated therein or therewith a neural net processor architecture, such as the neural net processor architecture 312 illustrated by FIG. 3. For example, the personal interactive speaker device 1202 may include a primary processor configured to control the device 1202, an input device configured to receive an input, a listening sub-system coupled with the input device and configured to convert the input into an output signal, and a neural net processor configured to receive the output signal from the listening sub-system and determine whether to generate a wake signal based on the received output signal.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

EXAMPLES

Illustrative examples of the technologies disclosed herein are provided below. An embodiment of the technologies may include any one or more, and any combination of, the examples described below.

Example 1 includes a system for operating an earbud, comprising: a primary processor configured to control the earbud; an input device configured to receive an input; a listening sub-system coupled with the input device and configured to convert the input into an output signal; and a neural net processor that is configured to receive the output signal from the listening sub-system and determine whether to generate a wake signal based on the received output signal.

Example 2 includes the system of Example 1 wherein the primary processor is operable in a low-power state and wherein the neural net processor is further configured to send the wake signal to the primary processor in order to cause the primary processor to come out of the low-power state.

Example 3 includes the system of any of Examples 1-2 wherein the neural net processor includes a neural net sub-system including a graph memory configured to store at least one computational flow.

Example 4 includes the system of Example 3 wherein the graph memory is dynamically configurable and re-configurable.

Example 5 includes the system of Example 3 wherein the neural net sub-system further includes a plurality of hardware accelerators configured to perform operations on the at least one computational flow stored in the graph memory.

Example 6 includes the system of Example 5 wherein the operations include either or both matrix multiplication and Fast Fourier Transforms.

Example 7 includes the system of Example 5 wherein the neural net sub-system further includes a memory arbiter configured to provide a direct interface between the graph memory and the plurality of hardware accelerators.

Example 8 includes the system of Example 7 wherein the memory arbiter is a neural net Direct Memory Access.

Example 9 includes the system of Example 5 wherein the neural net sub-system further includes a hardware sequencer configured to control which of the plurality of hardware accelerators are operational at any given time.

Example 10 includes the system of any of Examples 1-9 wherein the listening sub-system includes an Analog to Digital Converter, the input includes a time-varying analog signal, and the output signal includes a digital representation of the time-varying analog signal.

Example 11 includes the system of any of Examples 1-10 wherein the listening sub-system includes at least one motion sensor and the input includes a motion measurement.

Example 12 includes the system of any of Examples 1-11 wherein the listening sub-system includes at least one environmental sensor and the input includes an environmental measurement.

Example 13 includes the system of any of Examples 1-12 wherein the listening sub-system includes either or both a proximity and a pressure sensor.

Example 14 includes a method for operating an earbud, the method comprising: receiving an input from an input device; converting the input into an output signal by a listening sub-system coupled with the input device; determining by a neural net processor whether to generate a wake signal based on the output signal; and generating the wake signal by the neural net processor responsive to a determination that the wake signal should be generated.

Example 15 includes the method of Example 14 further comprising sending the wake signal to a primary processor to cause the primary processor to come out of a low-power state.

Example 16 includes the method of any of Examples 14-15 further comprising storing at least one computational flow by a graph memory of a neural net sub-system.

Example 17 includes the method of Example 16 further comprising performing operations on the at least one computational flow by a plurality of hardware accelerators of the neural net sub-system.

Example 18 includes the method of Example 16 further comprising controlling by a hardware sequencer which of the plurality of hardware accelerators are operational at any given time.

Example 19 includes a neural net sub-system of an earbud, comprising: a graph memory configured to store at least one computational flow; a plurality of hardware accelerators configured to perform operations on the at least one computational flow stored in the graph memory; and a memory arbiter configured to provide a direct interface between the graph memory and the plurality of hardware accelerators.

Example 20 includes the sub-system of Example 19 further comprising a hardware sequencer configured to control which of the plurality of hardware accelerators are operational at any given time.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

The invention claimed is:

1. An earbud having a system for operating the earbud, comprising:
   a primary processor configured to control the earbud;
   a microphone configured to receive an input;
   a casing having a speaker configured to provide audio output from the primary processor to a user's ear, the casing being configured to maintain a position in a user's ear canal to maintain a position of the speaker within the user's ear;
   an always-on listening sub-system coupled with the microphone and configured to convert the input into an output signal; and
   a neural net processor configured to receive the output signal from the listening subsystem and determine whether to generate a wake signal based on the received output signal.

2. The system of claim 1 wherein the primary processor is operable in a low-power state and the neural net processor is further configured to send the wake signal to the primary processor to cause the primary processor to come out of the low-power state.

3. The system of claim 1 wherein the neural net processor includes a neural net sub-system including a graph memory configured to store at least one computational flow.

4. The system of claim 3 wherein the graph memory is dynamically configurable and reconfigurable.

5. The system of claim 3 wherein the neural net sub-system further includes a plurality of hardware accelerators configured to perform operations on the at least one computational flow stored in the graph memory.

6. The system of claim 5 wherein the operations include either or both matrix multiplication and Fast Fourier Transforms.

7. The system of claim 5 wherein the neural net sub-system further includes a memory arbiter configured to provide a direct interface between the graph memory and the plurality of hardware accelerators.

8. The system of claim 7 wherein the memory arbiter is a neural net Direct Memory Access.

9. The system of claim 5 wherein the neural net sub-system further includes a hardware sequencer configured to control which of the plurality of hardware accelerators are operational at any given time.

10. The system of claim 1 wherein the always-on listening sub-system includes an Analog to Digital Converter, the input includes a time-varying analog signal, and the output signal includes a digital representation of the time-varying analog signal.

11. The system of claim 1 wherein the always-on listening sub-system includes at least one motion sensor and the input includes a motion measurement.

12. The system of claim 1 wherein the always-on listening sub-system includes at least one environmental sensor and the input includes an environmental measurement.

13. The system of claim 1 wherein the always-on listening sub-system includes either or both a proximity and a pressure sensor.

14. A method for operating an earbud, comprising:
   receiving an input from a microphone of the earbud;
   providing audio output to a user by way of a speaker integrated with a casing of the earbud, the casing being configured to maintain a position in a user's ear canal to maintain a position of the speaker within the user's ear;
   converting the input into an output signal by an always-on listening sub-system coupled with the input device;
   determining by a neural net processor whether to generate a wake signal based on the output signal; and
   generating the wake signal by the neural net processor responsive to a determination that the wake signal should be generated.

15. The method of claim 14 further comprising sending the wake signal to a primary processor to cause the primary processor to come out of a low-power state.

16. The method of claim 14 further comprising storing at least one computational flow by a graph memory of a neural net sub-system.

17. The method of claim 16 further comprising performing operations on the at least one computational flow by a plurality of hardware accelerators of the neural net sub-system.

18. The method of claim 16 further comprising controlling by a hardware sequencer which of the plurality of hardware accelerators are operational at any given time.

19. A neural net sub-system of an earbud, comprising:
   an input coupled to an always-on listening sub-system, the always-on listening sub-system coupled with a microphone and configured to convert an input received by the microphone into an output signal and to send the output signal to the input of the neural net sub-system;
   a graph memory configured to store at least one computational flow;
   a plurality of hardware accelerators configured to perform operations on the at least one computational flow stored in the graph memory;
   a memory arbiter configured to provide a direct interface between the graph memory and the plurality of hardware accelerators; and
   an interface to a main system processor of the earbud, the neural net sub-system configured to send a wake signal to the primary processor based on the output signal received from the always-on listening sub-system.

20. The sub-system of claim 19 further comprising a hardware sequencer configured to control which of the plurality of hardware accelerators are operational at any given time.

* * * * *

UNITED STATES PATENT AND TRADEMARK OFFICE
CERTIFICATE OF CORRECTION

PATENT NO. : 10,867,605 B2  
APPLICATION NO. : 16/399757  
DATED : December 15, 2020  
INVENTOR(S) : Christopher James O'Connor It is certified that error appears in the above-identified patent and that said Letters Patent is hereby corrected as shown below:

In the Specification

Column 1, Line 42, delete "Ski" and insert -- Siri --.
Column 1, Line 48, delete "Ski" and insert -- Siri --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*